(12) United States Patent
Lamers

(10) Patent No.: US 12,515,146 B2
(45) Date of Patent: Jan. 6, 2026

(54) DEGASSING DEVICE, HEATING AND/OR COOLING SYSTEM, AND METHOD

(71) Applicant: Spiro Enterprises B.V., Sint Anthonis (NL)

(72) Inventor: Antonius Gerardus Wilhelmus Maria Lamers, Asten (NL)

(73) Assignee: Spiro Enterprises B.V., Sint Anthonis (NL)

( * ) Notice: Subject to any disclaimer, the term of this patent is extended or adjusted under 35 U.S.C. 154(b) by 578 days.

(21) Appl. No.: 17/912,264

(22) PCT Filed: Mar. 17, 2021

(86) PCT No.: PCT/NL2021/050181
§ 371 (c)(1),
(2) Date: Sep. 16, 2022

(87) PCT Pub. No.: WO2021/187981
PCT Pub. Date: Sep. 23, 2021

(65) Prior Publication Data
US 2023/0135627 A1 May 4, 2023

(30) Foreign Application Priority Data
Mar. 17, 2020 (NL) ...................... 2025151

(51) Int. Cl.
*B01D 53/22* (2006.01)
*B01D 3/00* (2006.01)
(Continued)

(52) U.S. Cl.
CPC ......... *B01D 19/0063* (2013.01); *B01D 3/007* (2013.01); *F25B 21/02* (2013.01)

(58) Field of Classification Search
CPC ...... B01D 19/0063; B01D 3/007; F25B 21/02
See application file for complete search history.

(56) References Cited

U.S. PATENT DOCUMENTS 2,654,361 A * 10/1953 Losching ................ F24H 1/186
126/101
4,713,944 A * 12/1987 Januschkowetz ....... F25B 17/08
62/480
(Continued)

FOREIGN PATENT DOCUMENTS

EP 3479029 A1 5/2019
JP H05192511 A 8/1993
(Continued)

OTHER PUBLICATIONS

JP2004267815_MT translation (Year: 2004).*
(Continued)

Primary Examiner — Anthony R Shumate
(74) Attorney, Agent, or Firm — Banner & Witcoff, Ltd.

(57) ABSTRACT

Degassing device for degassing a liquid flow, including: a housing for receiving liquid from the liquid flow therein, the housing having one or more ports for connecting to the liquid flow: a valve arranged for allowing gas to escape from the housing; and a heater arranged at least partly inside the housing for raising a temperature of the liquid received in the housing with respect to a further temperature of the liquid flow.

19 Claims, 2 Drawing Sheets

(51) Int. Cl.
    *B01D 19/00*     (2006.01)
    *F25B 21/02*     (2006.01)

(56)                References Cited

U.S. PATENT DOCUMENTS

| | | | | |
|---|---|---|---|---|
| 5,323,846 | A  * | 6/1994 | Ehr | G01N 27/44708 |
| | | | | 165/95 |
| 2007/0140916 | A1 | 6/2007 | Spiss | |
| 2011/0064520 | A1 * | 3/2011 | Bergstrom | E01C 11/26 |
| | | | | 165/56 |
| 2018/0119597 | A1 * | 5/2018 | Styron | F01P 7/165 |
| 2020/0404862 | A1 * | 12/2020 | Bowles | F25B 21/04 |
| 2021/0154389 | A1 * | 5/2021 | Turner | A61M 1/3633 |
| 2021/0331089 | A1 * | 10/2021 | Silvestrini | B01D 19/0042 |
| 2022/0049653 | A1 * | 2/2022 | Bollinger | F02C 1/05 |
| 2024/0218925 | A1 * | 7/2024 | Stocks | B60L 1/02 |

FOREIGN PATENT DOCUMENTS

| | | | |
|---|---|---|---|
| JP | 2004267815 | A | 9/2004 |
| WO | 2018004347 | A1 | 1/2018 |

OTHER PUBLICATIONS

JP2004267815_MT claims (Year: 2004).*
JP HO5192511_MT (Year: 1993).*
JP2004267815_MT (Year: 2004).*
International Search Report and Written Opinion—PCT/NL2021/050181—mailing date Sep. 23, 2021.

* cited by examiner

DEGASSING DEVICE, HEATING AND/OR COOLING SYSTEM, AND METHOD

CROSS-REFERENCE TO RELATED APPLICATIONS

This application is a U.S. National Stage application under 35 U.S.C. § 371 of International Application PCT/NL2021/050181 (published as WO 2021/187981 A1), filed Mar. 17, 2021 which claims the benefit of priority to Application NL 2025151, filed Mar. 17, 2020. Benefit of the filing date of these prior applications is hereby claimed. Each of these prior applications is hereby incorporated by reference in its entirety.

FIELD OF THE INVENTION

The invention relates to a degassing device for degassing a liquid flow. More in general, the invention relates to heating and/or cooling systems.

BACKGROUND TO THE INVENTION

Heating and/or cooling systems are known per se. Many of these systems include a closed circuit comprising a heating and/or cooling medium, such as a liquid. In these systems, gas may be present within the closed circuit. The gas may be free gas, e.g. bubbles or gas heads within components in the closed circuit, or gas dissolved in the liquid heating and/or cooling medium. It is preferred to remove the gas from the medium.

Heating and/or cooling systems are known which have a degassing device comprising a valve which is, e.g. manually, opened during maintenance for removing gas from the closed circuit. Also, automatic degassing devices are known, such as automatic micro-bubble degassing devices.

SUMMARY OF THE INVENTION

It is an object to provide a degassing device with improved efficiency for degassing the liquid flow. In particular it is an object to provide a degassing device with improved efficiency for degassing the liquid flow in a heating and/or cooling system including a closed liquid flow circuit.

Thereto, according to an aspect, is provided a degassing device for degassing a liquid flow, including a housing for receiving liquid from the liquid flow therein, the housing having one or more ports for connecting to the liquid flow. It will be appreciated that the housing can be liquid and gas tight, the one or more ports allowing liquid to enter and leave the housing. The degassing device includes a valve arranged for allowing gas to escape from the housing. The degassing device includes a heater arranged at least partly inside the housing for raising a temperature of the liquid received in the housing with respect to a further temperature of the liquid flow. The maximum dissolvable gas content, or solubility, in a liquid depends on the temperature and pressure of the liquid. The maximum dissolvable gas content decreases with increasing temperature. The maximum dissolvable gas content increases with increasing pressure. The heater can heat the liquid in the housing, thereby reducing the solubility of gas in said liquid. Hence degassing of the liquid in the housing is promoted.

By thus raising a temperature of the liquid in the housing, solubility of gas in said liquid can be efficiently reduced for effective degassing, in particular locally in the housing. It will be appreciated that such a raise in temperature may be substantially spatially inhomogeneous within the housing. For example, a temperature of liquid close to the heater (e.g. at a heater surface, such as in a liquid boundary layer at the heater surface) may thus be substantially raised locally for effective degassing of the liquid there, while temperatures of liquid elsewhere in the housing may remain substantially constant and/or increase to a lesser extent. Preferably, during use, the liquid is heated by the heater substantially at a respective heating surface which extends in one or more local areas inside the housing, while liquid in other areas inside the housing remains substantially unheated by the heater.

The liquid will have a certain dissolved gas content, e.g. given in ml of gas per liter of liquid. Preferably, the liquid is locally heated to a temperature at which the solubility of the gas is lower than the actual amount of gas dissolved in the liquid. At such temperature degassing is promoted efficiently. Gas bubbles may e.g. efficiently form in the liquid when locally heated such a temperature. The actual dissolved gas content in the liquid may not be known to the user. The maximum actually dissolved gas content can be estimated. An estimate of the maximum dissolved gas content in the liquid can be the solubility of the gas in the liquid corresponding to the point in the liquid flow having the combination of pressure and temperature corresponding to the lowest solubility, e.g. the point in the liquid flow having the highest temperature and the lowest pressure.

Optionally, the liquid is locally heated to a temperature close to the boiling temperature, e.g. within 15° C., such as within 10° C., or within 5° C., from the boiling temperature. When the liquid is close to the boiling temperature, the solubility of gas is the liquid is very low. Hence degassing is promoted efficiently. Gas bubbles may e.g. efficiently form in the liquid when locally heated to close to the boiling temperature.

Preferably, the liquid is locally heated to a temperature that is higher than the temperature at which the solubility of the gas equals the estimated maximum or actual amount of gas dissolved in the liquid, and that is lower than the boiling temperature of the liquid.

Optionally, the degassing device is arranged such that, in use, a surface temperature of the heater is close to, or even higher than, the temperature at which the solubility of the gas equals the estimated maximum or actual amount of gas dissolved in the liquid. Thus the liquid can easily locally be heated to a temperature corresponding to a solubility that is lower than the actual dissolved gas content. Hence, the formation of bubbles of gas in the liquid is promoted, in particular locally at the heater, said bubbles subsequently moving up and out of the liquid as a result of their lower density compared to the liquid. Thus, dissolved gas in the liquid can be brought out of solution for degassing the liquid. The degassing device can be arranged such that, in use, a surface temperature of the heater is higher than the temperature at which the solubility of the gas equals the estimated maximum or actual amount of gas dissolved in the liquid. The degassing device can be arranged such that, in use, the surface temperature of the heater is more than 5° C., such as more than 10° C., or more than 15° C., higher than the temperature at which the solubility of the gas equals the estimated maximum or actual amount of gas dissolved in the liquid.

Optionally, a boiling of the liquid in the housing is prevented, for example by controlling a temperature at the heater to limit said temperature to a predetermined maximum temperature which is below a boiling temperature of the liquid. Thus, loss of liquid from the liquid flow (by liquid in vapor phase exiting through the valve) can be minimized or prevented. The degassing device can be arranged such that, in use, a surface temperature of the heater is lower than the boiling temperature of the liquid The degassing device preferably includes a float arranged for operating the valve.

Preferably, in use, the housing is at most partially filled with the liquid. Hence, the housing includes a gas head. The heater can be positioned in the same chamber of the housing that includes the gas head portion, so that gas can easily accumulate. The heater can then promote separation of gas from the liquid, e.g. as bubbles, and the gas can then be separated from the liquid by gravity, i.e. by bubbles rising to the gas head. The gas separation can be performed without reduction of pressure in the housing. The float floats on the surface of the liquid in the housing. When a predetermined amount of gas has accumulated in the housing, the gas head reaches a predetermined volume, i.e. the liquid surface has dropped to a predetermined level, such that the float activates the valve to open and release the accumulated gas to the ambient atmosphere. Preferably, the valve is mounted to the housing in communication with the gas head portion.

The degassing device housing can include the port, e.g. an inlet, and a second port, e.g. an outlet, and a flow path extending from the port to the second port for allowing liquid to flow through the housing. In that case the degassing device can be used in a flow-through mode. It is also possible that the degassing device includes only a single port. In that case the separator device can be used in an end-mode.

Optionally the valve includes a check valve. Optionally, the valve includes a check valve in series with the float operated valve.

Optionally, the heater includes an electric heater comprising at least one heating element.

Optionally, the heater includes a heat exchanger for transferring heat to the liquid received inside the housing.

Optionally, the heater includes a heat pump arranged for transferring heat from outside the housing to inside the housing.

Optionally, the heat pump includes one or more thermoelectric heat pumps, such as Peltier devices.

Optionally, the heat pump is arranged for extracting heat from the liquid flow upstream and/or downstream of the housing.

Optionally, the heater is arranged to heat the received liquid at a liquid interface of the heater, said liquid interface having a total surface area A, wherein the device is arranged for degassing a liquid flow having a volume flow rate F, wherein the ratio A/F of said total surface area A to said volume flow rate F is at least $0.1$ $m^{-1} \cdot s$, preferably at least $0.5$ $m^{-1} \cdot s$, more preferably at least $1$ $m^{-1} \cdot s$, for example about $1.8$ $m^{-1} \cdot s$.

It has been found that such a configuration can provide effective and efficient degassing, in particular at a volume flow rate of about 1000 L per hour and a heating power of about 100 Watts. In such conditions, an advantageous total surface area A of the heater was found to be about $5$ $cm^2$.

Optionally, the degassing device includes a flow stabilizer for reducing turbulence of the liquid received in the housing.

Optionally, the heater is at least partly integrated with the flow stabilizer, wherein in particular a liquid interface of the flow stabilizer is configured to act as a liquid interface of the heater.

Such a flow stabilizer may comprise one or more spiral or helical structures which extend in the housing, during use in contact with the liquid therein. Degassing devices with flow stabilizing spiral structures are known as such, for example from the company Spirotech bv.

Optionally, the housing is provided with a thermally insulating layer for reducing heat loss from the housing to an environment thereof.

Optionally, the degassing device includes a controller with at least one input for controlling the heater depending on the at least one input, wherein the at least one input is provided with a temperature sensor for sensing a temperature of the liquid flow.

Optionally, the temperature sensor is arranged for sensing a temperature of the liquid received in the housing.

Optionally, the temperature sensor is arranged for sensing a temperature at the heater, in particular at a heating surface thereof.

Optionally, the at least one input is provided with a pressure sensor for sensing a fluid pressure in the housing.

Optionally, the at least one input is provided with a flow sensor for sensing a flow rate and/or flow velocity of the liquid flow.

Optionally, the at least one input is configured for receiving information from an external controller which is associated with the liquid flow.

Optionally, said information includes an indication of a flow regulating state and/or a heat transfer state of said external controller.

According to an aspect is provided a heating and/or cooling system including a liquid flow circuit for circulating a liquid flow. It will be appreciated that the liquid flow circuit forms a closed circuit. The heating and/or cooling system includes a degassing device as described hereinabove connected to said circuit for degassing said liquid flow.

According to an aspect is provided a heating and/or cooling system including a closed liquid flow circuit for circulating a liquid flow. The heating and/or cooling system includes a heat source for heating the liquid flow and/or a cold source for cooling the liquid flow, a pump for driving the liquid flow in the circuit, and at least one delivery unit for transferring heat between the heated and/or cooled liquid flow and a target of the heating and/or cooling system. The heating and/or cooling system includes a degassing device for degassing the liquid flow, including a housing for receiving liquid from the liquid flow therein, the housing having an inlet and an outlet for connecting to the liquid flow. The degassing device includes a valve arranged for allowing gas to escape from the housing. The degassing device includes a heater arranged at least partly inside the housing for raising a temperature of the liquid received in the housing with respect to a further temperature of the liquid flow.

Optionally, the degassing device is connected to one or more of the heat source, the cold source, the pump and the at least one delivery unit for receiving therefrom and/or sending thereto state information, sensing information and/or one or more control signals.

Optionally, the heater is arranged for raising the temperature of the liquid spatially inhomogeneously, such as locally, within the housing.

Optionally, the heating and/or cooling system is arranged such that, in use, a surface temperature of the heater is higher than the temperature at which the solubility of the gas equals the estimated maximum or actual amount of gas dissolved in the liquid.

Optionally, the heating and/or cooling system is arranged such that, in use, a surface temperature of the heater is lower than a boiling temperature of the liquid.

Optionally, the heater includes an electric heater comprising at least one heating element.

Optionally, the heater includes a heat exchanger for transferring heat to the liquid received inside the housing.

Optionally, the heater includes a heat pump arranged for transferring heat from outside the housing to inside the housing.

Optionally, the heat pump is arranged for extracting heat from the liquid flow downstream of the housing.

Optionally, the heat pump comprises one or more thermoelectric heat pumps, such as Peltier devices.

Optionally, the heater is arranged to heat the received liquid at a liquid interface of the heater, said liquid interface having a total surface area A, wherein the device is arranged for degassing a liquid flow having a volume flow rate F, wherein the ratio A/F of said total surface area A to said volume flow rate F is at least $0.1$ $m^{-1}·s$, preferably at least $0.5$ $m^{-1}·s$, more preferably at least $1$ $m^{-1}·s$, for example about $1.8$ $m^{-1}·s$.

Optionally, the heating and/or cooling system includes a float arranged for operating the valve.

Optionally, the heating and/or cooling system includes a flow stabilizer for reducing turbulence of the liquid received in the housing.

Optionally, the heater is at least partly integrated with the flow stabilizer, wherein in particular a liquid interface of the flow stabilizer is configured to act as a liquid interface of the heater.

Optionally, the housing is provided with a thermally insulating layer for reducing heat loss from the housing to an environment thereof.

Optionally, the heating and/or cooling system includes a controller with at least one input for controlling the heater depending on the at least one input, wherein the at least one input is provided with a temperature sensor for sensing a temperature of the liquid flow.

Optionally, the temperature sensor is arranged for sensing a temperature of the liquid received in the housing.

Optionally, the at least one input is provided with a flow sensor for sensing a flow rate and/or flow velocity of the liquid flow.

Optionally, the at least one input is configured for receiving information from an external controller which is associated with the liquid flow.

Optionally, said information includes an indication of a flow regulating state and/or a heat transfer state of said external controller.

According to an aspect is provided a method for degassing a liquid flow, including receiving liquid from a liquid flow in a housing of a degassing device connected to said flow, for example a degassing device as described hereinabove, the device including a valve arranged for allowing gas to escape from the housing. The method includes raising a temperature of the liquid received in the housing with respect to a further temperature of the liquid flow, thereby promoting the formation of gas in the liquid and/or the release of gas from the liquid in the housing The method includes removing gas from the housing via the valve.

Optionally, the method includes detecting that an amount of heat released by the degassing device via the liquid flow exceeds a predetermined level relative to an amount of heat generated by a heater of the degassing device The method can include in response to the detecting, controlling the heater of the degassing device to reduce heat generation by the heater.

Optionally, the raising includes transferring heat from the liquid flow upstream and/or downstream of the degassing device to inside the housing of the degassing device.

Optionally, the method includes stabilizing a liquid flow inside the housing of the degassing device, for reducing turbulence.

Optionally, the method includes receiving state information, sensing information and/or one or more control signals by the degassing device from a further device associated with the liquid flow, wherein the raising is at least partly dependent on the receiving.

Optionally, the method includes sending state information, sensing information and/or one or more control signals from the degassing device to a further device associated with the liquid flow, in particular in response to a detected change at the degassing device.

Optionally, the method includes sensing a flow rate and/or flow velocity of the liquid flow, wherein the raising is at least partly dependent on the sensed flow rate and/or flow velocity.

It will be appreciated that any of the aspects, features and options described in view of the degassing devices apply equally to the system and the method. It will also be clear that any one or more of the above aspects, features and options can be combined.

BRIEF DESCRIPTION OF THE DRAWING

The invention will further be elucidated on the basis of exemplary embodiments which are represented in a drawing. The exemplary embodiments are given by way of non-limitative illustration. It is noted that the figures are only schematic representations of embodiments of the invention that are given by way of non-limiting example.

In the drawing.

DETAILED DESCRIPTION

Figure 1:
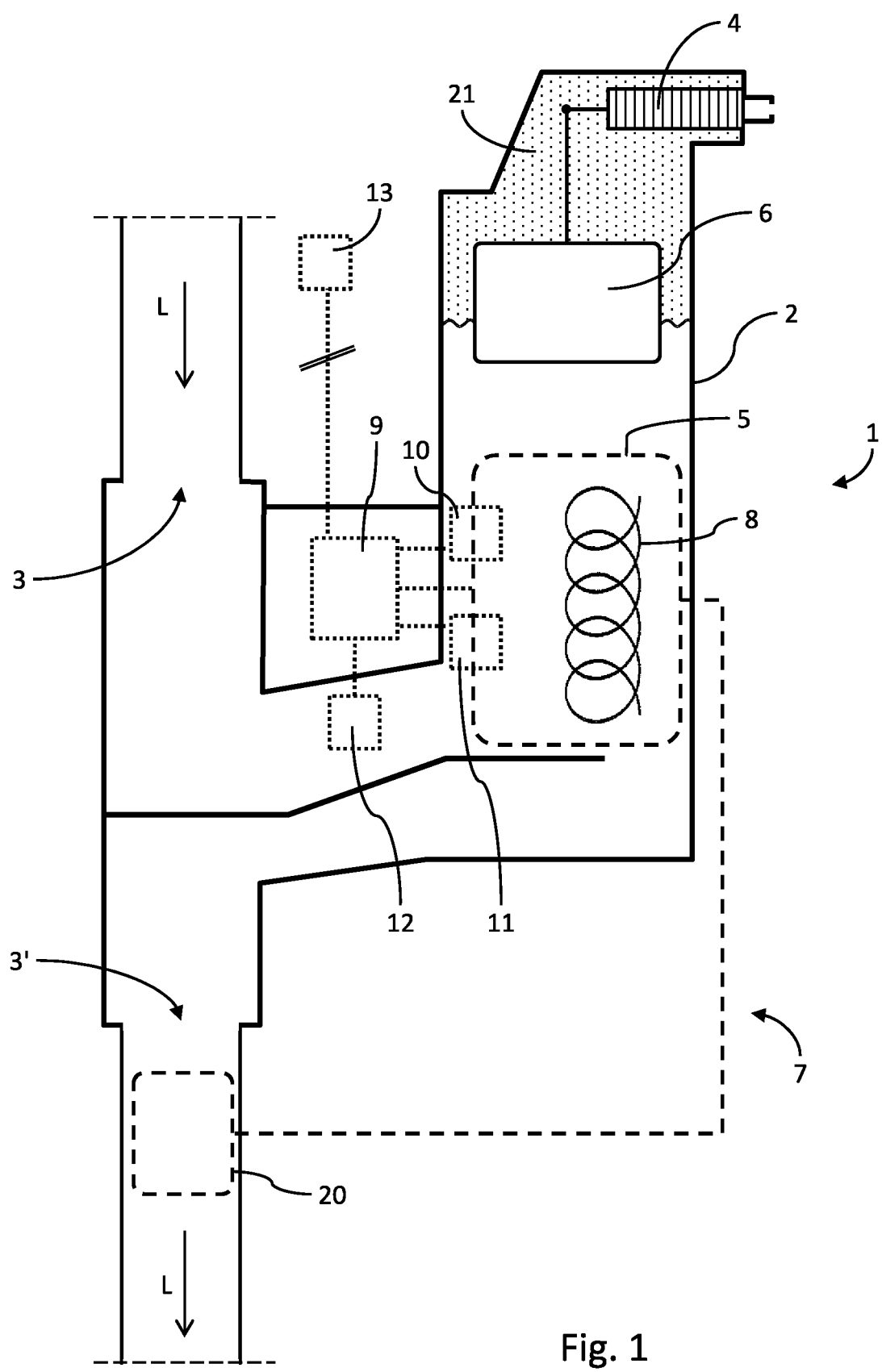
FIG. 1 shows a schematic view of a degassing device.

FIG. 1 shows a schematic cross sectional view of a degassing device 1 for degassing a liquid flow L. The degassing device 1 includes a housing 2 for receiving liquid from the liquid flow L therein. It will be appreciated that the housing 2 can be liquid and gas tight. The housing 2 has one or more ports 3, 3' for connecting to the liquid flow L. The housing 2 has a portion for accumulating a gas head 21. The degassing device 1 includes a valve 4 arranged for allowing gas to escape from the housing 2. As shown in the example of FIG. 1, the valve 4 is attached to the housing 2. The valve 4 is positioned in the gas head 21 portion of the housing. The device 1 includes a heater 5 arranged at least partly inside the housing 2 for raising a temperature of the liquid received in the housing 2 with respect to a further temperature of the liquid flow L. In the example of FIG. 1 the heater 5 is positioned in the same chamber 2 of the housing that includes the gas head portion.

The heater 5 is indicated schematically in FIG. 1. It will be appreciated that such a heater 5 can be realized in many different ways, examples of which will be provided below. The indication as such of the heater 5 in FIG. 1 is not to be construed as limiting any aspect thereof, in particular not limiting a dimension or a position of the heater 5.

In this example the device 1 includes a float 6 arranged for operating the valve 4. The float floats on the liquid level at the lower end of the gas head 21. Alternatively or additionally the valve 4 may be operated, e.g. electronically, e.g. by a controller 9 of the device 1.

In an example the heater 5 includes an electric heater comprising at least one heating element. In an example the heater 5 includes a heat exchanger for transferring heat to the liquid received inside the housing 2.

In the example of FIG. 1 the heater includes a heat pump 7 arranged for transferring heat from outside the housing 2 to inside the housing 2. In this example the heat pump 7 is arranged for extracting heat from the liquid flow F downstream of the housing 2, e.g. from a downstream area 20. Thus, the heat pump 7 may be configured to cool the liquid flow L at the downstream area 20, thereby transferring heat from said area 20 to (part of) the heater 5. The heat pump 7 may comprise one or more thermoelectric heat pumps or Peltier devices.

Alternatively or additionally the heater 5, e.g. the heat pump 7, may be configured to transfer heat from a heat source 16 (see FIG. 2) which is associated with the liquid flow L to inside the housing 2.

In this example the heater 5 is arranged to heat the received liquid at a liquid interface of the heater 5, said liquid interface having a total surface area A. The device is arranged for degassing a liquid flow L having a volume flow rate F. Here the ratio A/F of said total surface area A to said volume flow rate F is at least $0.1\ m^{-1} \cdot s$, preferably at least $0.5\ m^{-1} \cdot s$, more preferably at least $1\ m^{-1} \cdot s$, for example about $1.8\ m^{-1} \cdot s$.

In this example the device 1 includes a flow stabilizer 8 for reducing turbulence of the liquid received in the housing 2. In FIG. 1, the flow stabilizer 8 is indicated schematically by a single helical or spiral structure. It will be appreciate that a flow stabilizer 8 may comprise more, or alternatively no, helical or spiral structures. The flow stabilizer 8 may be arranged in one or more areas inside the housing 2, optionally overlapping (e.g. partially) with one or more areas in which the heater 5 extends.

In this example the heater 5 is at least partly integrated with the flow stabilizer 8, wherein in particular a liquid interface of the flow stabilizer 8 is configured to act as a liquid interface of the heater 5.

In particular a helical or spiral structure of the flow stabilizer 8 may comprise and/or be part of a heating element of the heater 5. Such a configuration can be particularly advantageous since a large heating surface area of the heater 5 can thus be realized, wherein during use the heating surface is in contact with a substantially stabilized liquid, thereby promoting effective and efficient degassing of the liquid.

In particular, the flow stabilizer may include an axially extending core, a spiral structure surrounding the core, and a plurality of spokes connecting the spiral structure to the core. The core and/or the spokes and/or the spiral structure may comprise and/or be part of a heating element of the heater 5.

The housing 2 may be provided with a thermally insulating layer for reducing heat loss from the housing 2 to an environment thereof.

In this example the device 1 includes a controller 9 with at least one input for controlling the heater 5 depending on the at least one input. Here the at least one input is provided with a temperature sensor 10 for sensing a temperature of the liquid flow L. In this example the temperature sensor 10 is arranged for sensing a temperature of the liquid received in the housing 2.

It will be appreciated that such a temperature sensor 10 may be realized in many different ways and at many different positions within the housing 2. The temperature sensor 10 is preferably arranged for sensing a temperature at the heater 5, for example at a heating surface thereof. Multiple temperature sensors may be provided.

The controller 9 may be configured to substantially prevent a boiling of the liquid in the housing 2, for example by controlling a temperature at the heater 5 to limit said temperature to a predetermined maximum temperature which is below a boiling temperature of the liquid. To that end, the controller 9 may receive temperature sensing information from the temperature sensor 10 which is preferably arranged for sensing a temperature on or at a heating contact surface of the heater 5. The controller 9 may e.g. be configured to control a surface temperature of the heater to be within 15° C., such as within 10° C., or within 5° C., of the boiling temperature of the liquid.

The controller 9 may be configured to locally heat the liquid to a temperature that is higher than the temperature at which the solubility of the gas equals the estimated maximum or actual amount of gas dissolved in the liquid, at the pressure prevailing at the heater. Preferably, the controller 9 is configured to locally heat the liquid to a temperature that is higher than the temperature at which the solubility of the gas equals the estimated maximum or actual amount of gas dissolved in the liquid and that is lower than the boiling temperature of the liquid.

In this example the at least one input is additionally, or alternatively, provided with a pressure sensor 11 for sensing a fluid pressure in the housing 2. In this example the at least one input is additionally, or alternatively, provided with a flow sensor 12 for sensing a flow rate and/or flow velocity of the liquid flow L. Such flow and/or pressure sensors can be realized in many different ways. A pressure sensor 11 may be arranged for sensing a liquid pressure of the liquid in the housing and/or a gas pressure of the gas in the housing (e.g. in the gas head 21).

Figure 2:
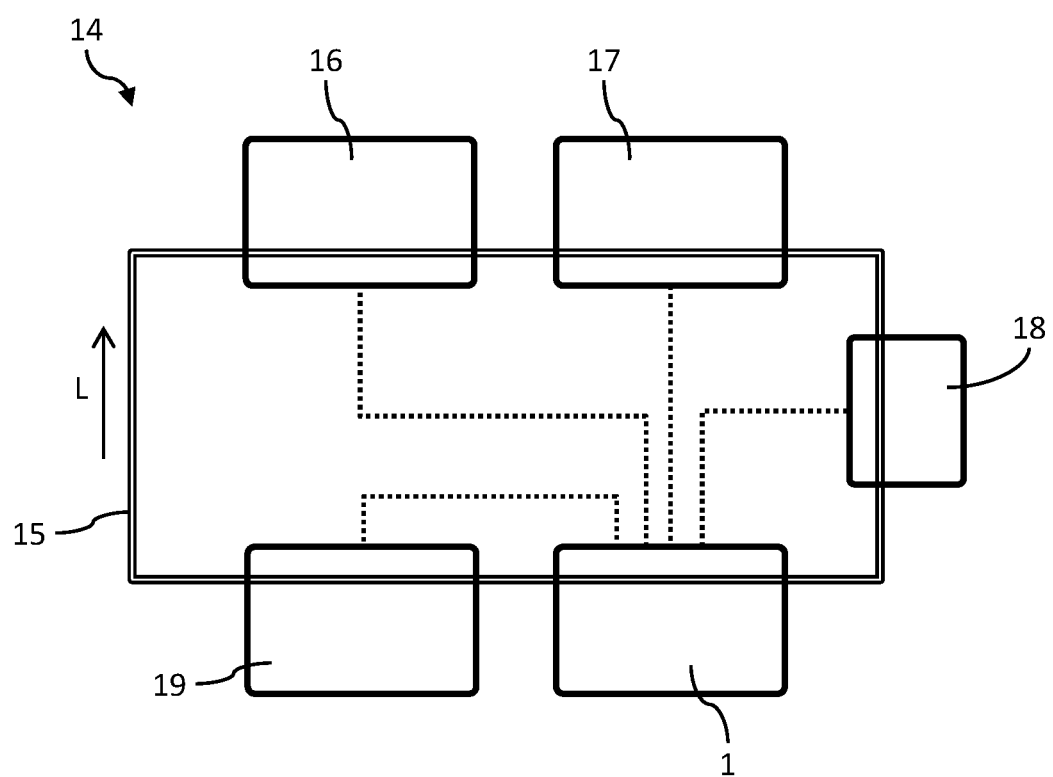
FIG. 2 shows a schematic view of a heating and/or cooling system.

In this example the at least one input is additionally, or alternatively, configured for receiving information from an external controller 13 which is associated with the liquid flow L. With reference to FIG. 2, such an external controller 13 may be a controller of a further device 16, 17, 18 and/or 19 associated with the liquid flow, e.g. of a heat source 16, a cold source 17, a pump 18 and/or a delivery unit 19.

Said information may include an indication of a flow regulating state and/or a heat transfer state of said external controller 13.

FIG. 2 shows a schematic diagram of a heating and/or cooling system 14 including a liquid flow circuit 15 for circulating a liquid flow L and including a degassing device 1 connected to said circuit 15 for degassing said liquid flow L.

In this example the heating and/or cooling system 14 includes a heat source 16 for heating the liquid flow L and a cold source 17 for cooling the liquid flow L. In this example the heating and/or cooling system 14 includes a pump 18 for driving the liquid flow L in the circuit 15. In this example the heating and/or cooling system 14 includes at least one delivery unit 19 for transferring heat between the heated and/or cooled liquid flow L and a target of the heating and/or cooling system 14. In this example the degassing device 1 is connected to the heat source 16, the cold source 17, the pump 18 and the at least one delivery unit 19 for receiving therefrom and/or sending thereto state information, sensing information and/or one or more control signals.

The degassing device 1 may be partially or fully integrated with a further device 16, 17, 18 and/or 19 of the system 14.

With reference to FIG. 1, a method for degassing a liquid flow L includes receiving liquid from a liquid flow L in a housing 2 of a degassing device 1 connected to said flow L, the device 1 including a valve 4 arranged for allowing gas to escape from the housing 2. The method includes raising a temperature of the liquid received in the housing 2 with respect to a further temperature of the liquid flow L, thereby promoting the formation of gas in the liquid and/or the release of gas from the liquid in the housing 2. The method further includes removing gas from the housing 2 via the valve 4.

By thus raising a temperature of the liquid in the housing 2, the solubility of gas in at least part of said liquid can be effectively and efficiently reduced, so that gas bubbles are thereby formed in the liquid, said bubbles subsequently traveling upward (due to lower density of the gas compared to the liquid) and thus going out of the liquid and into the gas head 21 which is thereby formed. Since in the example of FIG. 1 the heater 5 is positioned in the same chamber 2 of the housing that includes the gas head portion, the gas bubbles can easily accumulate in the gas head. Since also the valve 4 is positioned in the gas head 21 portion of the housing 2, the accumulated gas can easily removed from the housing 2.

It will be appreciated that it is not required that all or even most of the liquid in the housing be raised in temperature. Gas bubbles may be formed substantially in those areas wherein the liquid temperature is substantially raised, whereas less or no gas bubbles may be formed elsewhere in the liquid.

In an example the method includes: detecting that an amount of heat released by the degassing device 1 via the liquid flow L exceeds a predetermined level relative to an amount of heat generated by a heater 5 of the degassing device; and in response to the detecting, controlling the heater of the degassing device 1 to reduce heat generation by the heater 5.

Such a method can enable improved energy efficiency of the degassing and/or of the degassing device 1. Detection of the amount of heat released via the liquid flow L may comprise sensing a temperature downstream of the heater 5, e.g. between the heater 5 and the port 3'.

In an example the raising includes transferring heat from the liquid flow L downstream of the degassing device 1 to inside the housing 2 of the degassing device 1. Such a heat transfer may be effected by a heat pump 7, for example.

In an example the method includes stabilizing, e.g. using a flow stabilizer 8, a liquid flow inside the housing 2 of the degassing device 1, thereby reducing turbulence.

With reference to FIG. 2, the method may include receiving state information, sensing information and/or one or more control signals by the degassing device 2 from a further device 16, 17, 18 and/or 19 associated with the liquid flow L, wherein the raising is at least partly dependent on the receiving.

For example, the raising may thus be dependent on a pumping state of a pump 18 and/or on a heating state of a heat source 16, wherein for example the raising is enabled when the pump 18 in an active pumping state and when the heat source 16 is in an active heating state.

In an example the method includes sending state information, sensing information and/or one or more control signals from the degassing device 1 to a further device 16, 17, 18 and/or 19 associated with the liquid flow, in particular in response to a detected change at the degassing device 1.

The further device 16, 17, 18 and/or 19 may be configured for receiving such information and/or signal and to change a respective state thereof in response to the receiving. For example, the pump 18 may thus be activated in response to a request from the degassing device 1.

In an example the method includes sensing a flow rate and/or flow velocity of the liquid flow L, wherein the raising is at least partly dependent on the sensed flow rate and/or flow velocity. For example, the raising may thus be enabled when the sensed flow rate and/or flow velocity exceeds a predetermined minimum level.

Herein, the invention is described with reference to specific examples of embodiments of the invention. It will, however, be evident that various modifications and changes may be made therein, without departing from the essence of the invention. For the purpose of clarity and a concise description features are described herein as part of the same or separate embodiments, however, alternative embodiments having combinations of all or some of the features described in these separate embodiments are also envisaged.

Many modifications, variations, and alternatives are possible. The specifications, drawings and examples are, accordingly, to be regarded in an illustrative sense rather than in a restrictive sense.

For the purpose of clarity and a concise description features are described herein as part of the same or separate embodiments, however, it will be appreciated that the scope of the invention may include embodiments having combinations of all or some of the features described.

In the claims, any reference signs placed between parentheses shall not be construed as limiting the claim. The word 'comprising' does not exclude the presence of other features or steps than those listed in a claim. Furthermore, the words 'a' and 'an' shall not be construed as limited to 'only one', but instead are used to mean 'at least one', and do not exclude a plurality. The mere fact that certain measures are recited in mutually different claims does not indicate that a combination of these measures cannot be used to an advantage.

The invention claimed is:

1. A heating and/or cooling system including:
   a closed liquid flow circuit for circulating a liquid flow;
   a heat source for heating the liquid flow and/or a cold source for cooling the liquid flow,
   a pump for driving the liquid flow in the circuit,
   at least one delivery unit for transferring heat between the heated and/or cooled liquid flow, and
   a degassing device for degassing the liquid flow, including:
      a housing for receiving liquid from the liquid flow therein, the housing having an inlet and an outlet for connecting to the liquid flow;
      a valve arranged for allowing a gas to escape from the housing; and
      a heater arranged at least partly inside the housing for raising a temperature of the liquid received in the housing with respect to a further temperature of the liquid flow.

2. The heating and/or cooling system according to claim 1, wherein the heater is arranged for raising the temperature of the liquid spatially inhomogeneously within the housing.

3. The heating and/or cooling system according to claim 1, wherein the heater includes a heat exchanger for transferring heat to the liquid received inside the housing.

4. The heating and/or cooling system according to claim 1, wherein the heater includes a heat pump arranged for transferring heat from outside the housing to inside the housing.

5. The heating and/or cooling system according to claim 4, wherein the heat pump is arranged for extracting heat from the liquid flow downstream of the housing.

6. The heating and/or cooling system according to claim 4, wherein the heat pump comprises one or more thermoelectric heat pumps.

7. The heating and/or cooling system according to claim 1, including a flow stabilizer for reducing turbulence of the liquid received in the housing, wherein the heater is at least partly integrated with the flow stabilizer, wherein in particular a liquid interface of the flow stabilizer is configured to act as a liquid interface of the heater.

8. The heating and/or cooling system according to claim 1, wherein the degassing device is connected to one or more of the heat source, the cold source, the pump and the at least one delivery unit for receiving therefrom and/or sending thereto state information, sensing information and/or one or more control signals.

9. The heating and/or cooling system according to claim 1, including a controller with at least one input for controlling the heater depending on the at least one input, wherein the at least one input is provided with a temperature sensor for sensing a temperature of the liquid flow.

10. The heating and/or cooling system according to claim 9, wherein the temperature sensor is arranged for sensing a temperature of the liquid received in the housing.

11. The heating and/or cooling system according to claim 9, wherein the at least one input is provided with a flow sensor for sensing a flow rate and/or flow velocity of the liquid flow.

12. The heating and/or cooling system according to claim 9, wherein the at least one input is configured for receiving information from an external controller which is associated with the liquid flow.

13. The heating and/or cooling system according to claim 12, wherein said information includes an indication of a flow regulating state and/or a heat transfer state of said external controller.

14. The heating and/or cooling system according to claim 9, wherein the controller is configured to control a surface temperature of the heater to be higher than the temperature at which the solubility of the gas equals the estimated maximum or actual amount of gas dissolved in the liquid.

15. The heating and/or cooling system according to claim 9, wherein the controller is configured to control a surface temperature of the heater to be lower than a boiling temperature of the liquid.

16. The heating and/or cooling system according to claim 1, wherein the heater is arranged to heat the received liquid at a liquid interface of the heater, said liquid interface having a total surface area A, wherein the device is arranged for degassing a liquid flow having a volume flow rate F, wherein the ratio A/F of said total surface area A to said volume flow rate F is at least $0.1\ m^{-1} \cdot s$.

17. The heating and/or cooling system according to claim 1, including a float arranged for operating the valve.

18. The heating and/or cooling system according to claim 1, wherein the housing is provided with a thermally insulating layer for reducing heat loss from the housing to an environment thereof.

19. A method for degassing a liquid flow, including:
receiving liquid from a liquid flow in a housing of the degassing device of the heating and/or cooling system according to claim 1 connected to said flow;
raising a temperature of the liquid received in the housing with respect to a further temperature of the liquid flow, thereby promoting the formation of gas in the liquid and/or the release of gas from the liquid in the housing; and
removing gas from the housing via the valve.

* * * * *